(12) United States Patent
Nishiura et al.

(10) Patent No.: US 8,049,749 B2
(45) Date of Patent: Nov. 1, 2011

(54) IMAGE GENERATOR FOR MEDICAL TREATMENT AND ITS METHOD

(75) Inventors: Masahide Nishiura, Tokyo (JP);
Tomoyuki Takeguchi, Kanagawa (JP);
Mieko Matsuda, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 947 days.

(21) Appl. No.: 11/840,380

(22) Filed: Aug. 17, 2007

(65) Prior Publication Data

US 2008/0101671 A1 May 1, 2008

(30) Foreign Application Priority Data

Oct. 31, 2006 (JP) .................................. 2006-296607

(51) Int. Cl.
*G06T 15/00* (2006.01)
(52) U.S. Cl. .......................... 345/419; 382/128; 382/154
(58) Field of Classification Search .................... 345/419
See application file for complete search history.

(56) References Cited

U.S. PATENT DOCUMENTS

| 5,594,849 | A  | * | 1/1997 | Kuc et al. ....................... 345/632 |
| 5,647,018 | A  | * | 7/1997 | Benjamin ...................... 382/128 |
| 6,187,032 | B1 | * | 2/2001 | Ohyu et al. .................... 600/409 |
| 6,248,070 | B1 |   | 6/2001 | Kanda et al. |
| 6,600,487 | B1 |   | 7/2003 | Henn et al. |
| 7,363,070 | B2 | * | 4/2008 | Ogata et al. ................... 600/409 |
| 2008/0101671 | A1 | * | 5/2008 | Nishiura et al. .............. 382/128 |

FOREIGN PATENT DOCUMENTS

| JP | 11-128191 | 5/1999 |
| JP | 2000-139917 | 5/2000 |

OTHER PUBLICATIONS

Chinese Office Action corresponding to U.S. Appl. No. 11/840,380 mailed on Jun. 19, 2009.
Japanese Office Action for Japanese Patent Application No. 2006-296607 mailed on Apr. 19, 2011.
European Search Report for Application No. 07016305.0-1224/1918883 dated May 24, 2011.
Bielser, D., et al., "A state machine for real-time cutting of tetrahedral meshes", Graphic Models 66 (2004) pp. 398-417.
Steinemann, et al., "Hybrid Cutting of Deformable Solids", IEEE, 2006 Proceedings of the IEEE Virtual Reality Conference, pp. 35-42.
Bajaj, C. L., et al., "Tetrahedral meshes from planar cross-sections", Computer Methods in Applied Mechanics and Engineering, 179 (1999) pp. 31-52.

* cited by examiner

*Primary Examiner* — Sath V Perungavoor
(74) *Attorney, Agent, or Firm* — Turocy & Watson, LLP

(57) ABSTRACT

An image generator for medical use includes a shape information acquiring unit acquiring shape information of a subject, a functional information acquiring unit acquiring a functional value of the subject, a polyhedron generating unit generating a polyhedron so as to have a clearance within a virtual display space on the basis of the acquired shape information, a functional information mapping unit allocating the functional information to a face of the polyhedron, and a display unit displaying and outputting the virtual display space.

16 Claims, 3 Drawing Sheets

FACE A

FACE B

IMAGE GENERATOR FOR MEDICAL TREATMENT AND ITS METHOD

CROSS-REFERENCE TO RELATED APPLICATIONS

This application is based upon and claims the benefit of priority from the prior Japanese Patent Application No. 2006-296607, filed on 31 Nov. 2006, the entire contents of which are incorporated herein by reference.

TECHNICAL FIELD

The present invention relates to an image generator for a medical treatment displaying a three-dimensional shape of a subject such as internal organs, and its method.

BACKGROUND OF THE INVENTION

In the diagnosis of a disease, it is important to observe the shapes of internal organs, etc. and a functional value. The functional value is often obtained every local part. It is desirable that a distribution of the functional value can be observed correspondingly to a local position of an internal organ mode.

Japanese Patent Application Kokai No. 11-128191 shows an example in which the functional value is displayed on a three-dimensional shape model surface, a sectional image, a developing view, and a projecting view. However, when a mode and the functional value are displayed by different images, it is necessary to compare plural images. Further, when the functional value is displayed in a model view such as a developing view and a projecting view, this view does not reflect an accurate shape of the subject. Therefore, a problem exists in that an observer must judge correspondence setting of a position in the model view and a position in the actual subject.

In Japanese Patent Application Kokai No. 2000-139917, it is described that a shape image showing the shape of the subject is synthesized into a functional image showing a function every local part, and is displayed. However, when the functional image is merely displayed in the shape image, the rear side of the three-dimensional subject is hidden and cannot be seen when the subject is observed from a certain one visual point. Therefore, a problem exists in that it becomes difficult to observe the entire subject at one time.

Further, in these display methods of the functional value, there is a problem unable to intuitively display the functional values of plural kinds at one time.

As mentioned above, when the mode and the functional value of the subject are displayed by different images in the prior art, it is necessary to compare plural images. Therefore, a problem exists in that the observer must judge the correspondence setting of a position in the functional value display image and a position in the actual subject shape.

Further, when the shape image and the functional image are synthesized, the rear side of the three-dimensional subject is hidden and cannot be seen. Therefore, a problem exists in that it becomes difficult to observe the entire subject at one time from a visual point of one place.

Further, it is impossible to intuitively display the functional values of plural kinds at one time.

Therefore, the present invention is made to solve the above problem points, and provides an image generator for a medical treatment and its method able to observe the mode and the functional value of the subject at one time without forcing a burden of the correspondence setting of positions upon the observer, and intuitively display the functional values of plural kinds at one time.

BRIEF SUMMARY OF THE INVENTION

According to embodiments of the present invention, an embodiment mode is an image generator for medical use, comprises:

a shape acquiring unit configured to acquire shape information showing a three-dimensional shape of a subject;

a functional information acquiring unit configured to acquire functional information showing least one state of each portion of the subject;

a polyhedron generating unit configured to generate three-dimensional data showing the three-dimensional shape of the subject by arranging plural polyhedrons so as to have a clearance in accordance with the shape information;

a mapping unit configured to respectively allocate the functional information at each of the polyhedrons to at least one face of each of the polyhedrons; and an image generating unit configured to project the three-dimensional data to an image plane, and generate an image of the subject of the three-dimensional shape on the image plane so that an area of the image corresponding to the at least one face shows the functional information allocated to the at least one face.

In accordance with the present invention, the subject of the three-dimensional shape can be grasped as an envelope surface of an aggregate of plural polyhedrons, and a clearance is arranged between the polyhedrons. Therefore, a hidden portion is small, and an entire aspect can be understood. Thus, the mode and the functional value of the subject can be observed at one time without forcing a burden of correspondence setting of a position onto an observer.

DETAILED DESCRIPTION OF THE INVENTION

An image generator 10 for a medical treatment in accordance with one embodiment mode of the present invention will next be explained.

(1) Construction of Image Generator 10 for Medical Treatment

Figure 1:
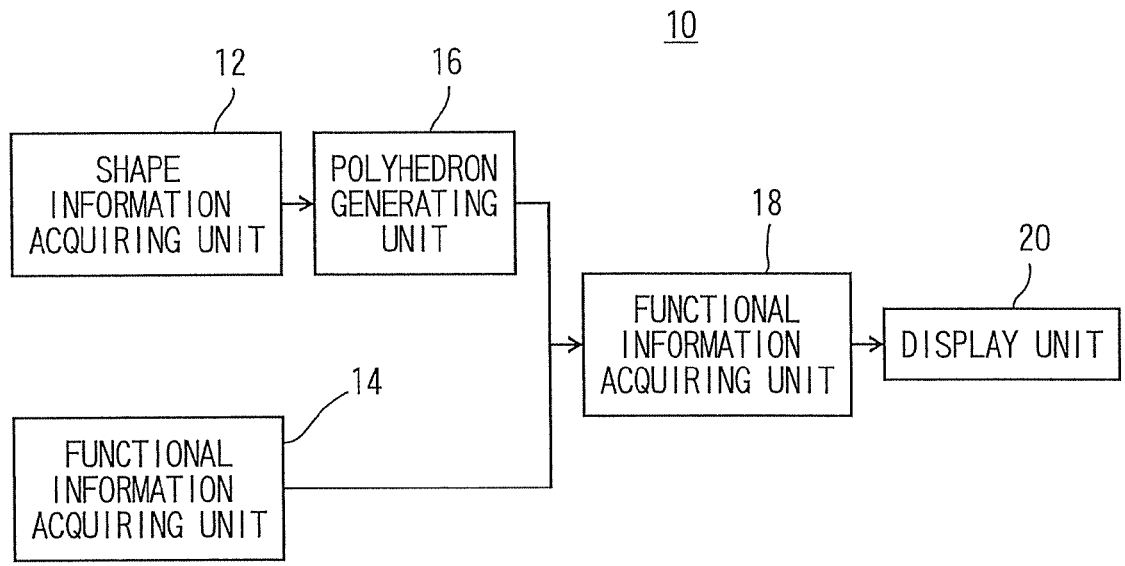
FIG. 1 is a block diagram showing the construction of an image generator for a medical treatment in accordance with one embodiment mode of the present invention.

The construction of the image generator 10 for a medical treatment in accordance with this embodiment mode will be explained on the basis of FIG. 1. FIG. 1 is a block diagram showing the image generator 10 for a medical treatment.

The image generator 10 for a medical treatment has a shape information acquiring unit 12 configured to acquire shape information of a subject, a functional information acquiring unit 14 configured to acquire a functional value of the subject, a polyhedron generating unit 16 configured to generate a polyhedron within a virtual display space on the basis of the acquired shape information, a functional information mapping unit 18 configured to allocate functional information onto a face of the polyhedron, and a display unit 20 configured to display and output the virtual display space.

For example, the image generator 10 for a medical treatment can be also realized by using a general purpose computer device. Namely, the shape information acquiring unit 12, the functional information acquiring unit 14, the polyhedron generating unit 16 and the functional information mapping unit 18 can be realized by executing a program by a processor arranged in the computer. The display unit 20 can be also realized by utilizing a monitor screen as an output device of the computer.

(2) Operation of Image Generator 10 for Medical Treatment

Figure 2:
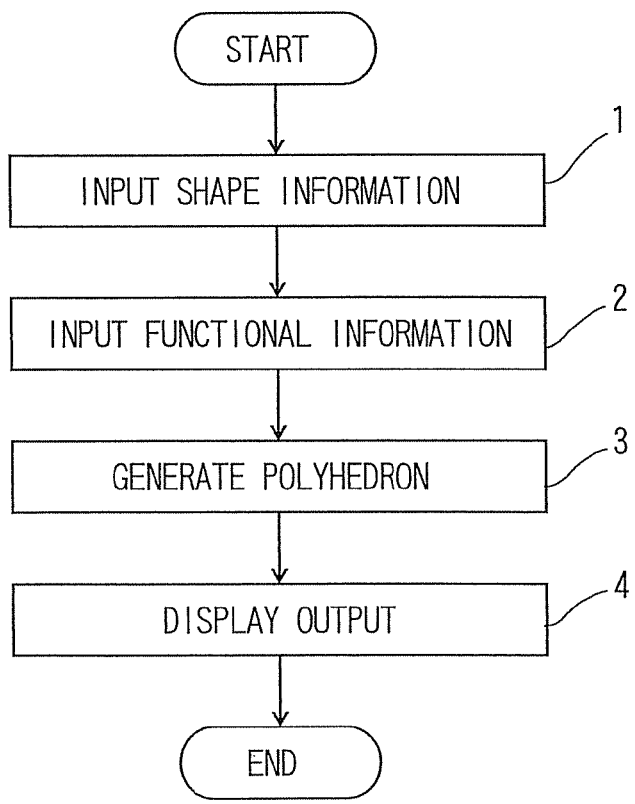
FIG. 2 is a flow chart showing the operation of the image generator for a medical treatment in this embodiment mode.

The operations of the respective units 12 to 20 of the image generator 10 for a medical treatment in accordance with this embodiment mode will next be explained by using the flow chart of FIG. 2.

(2-1) Shape Information Acquiring Unit 12

First, in step 1, shape information is inputted by the shape information acquiring unit 12. The "shape information" is data showing the shape of a subject such as internal organs. For example, the "shape information" is polygon data showing an internal organ boundary face of internal organs such as the heart and a blood vessel, i.e., a set of coordinate data of a wire frame, etc. When the shape of the subject is changed in time, etc., time series data of this shape may be also set to an input.

The boundary face of the subject may be also automatically extracted by using an image processing technique of edge detection, etc. from image data for a medical treatment (two-dimensional image data, three-dimensional voxel data), etc., and may be also manually inputted. Image data are given to the shape information acquiring unit 12, and the above shape information extracting means using an automatic operation or a manual operation may be also constructed so as to be arranged in the shape information acquiring unit 12.

(2-2) Functional Information Acquiring Unit 14

Next, in step 2, functional information of the subject is inputted by the functional information acquiring unit 14. For example, the "functional information" is information showing a function or state of the subject such as information of a movement of the subject, the amount of a blood flow, a contrast amount using a contrast agent, and a strain value of a muscle. The functional information is a value detected by a separate sensor, etc., a value calculated from a brightness value of image data, and a value calculated by image-analyzing the state of the subject within the image data in accordance with kinds of this functional information. The functional information acquiring unit 14 merely inputs the functional information obtained in the exterior as data. Otherwise, when the functional information is a kind calculated from the image data, it may be also set to a mode for calculating the functional information by setting the image data to an input and processing the image data.

(2-3) Polyhedron Generating Unit 16

Next, in step 3, the polyhedron generating unit 16 generates the subject of a three-dimensional shape as a set of plural polyhedrons using the shape information of the subject. These polyhedrons are generated within a space of display data finally displayed. An aggregate of these plural polyhedrons is arranged so as to grasp the three-dimensional shape of the subject and have a gap.

Concrete examples of arranging methods of the polyhedron are shown below.

(2-3-1) First Polyhedral Arranging Method

A first polyhedral arranging method is an example in which plural polyhedrons of a disk shape, a columnar shape, a cylindrical shape or a donut shape are spaced and arranged.

Figure 3:
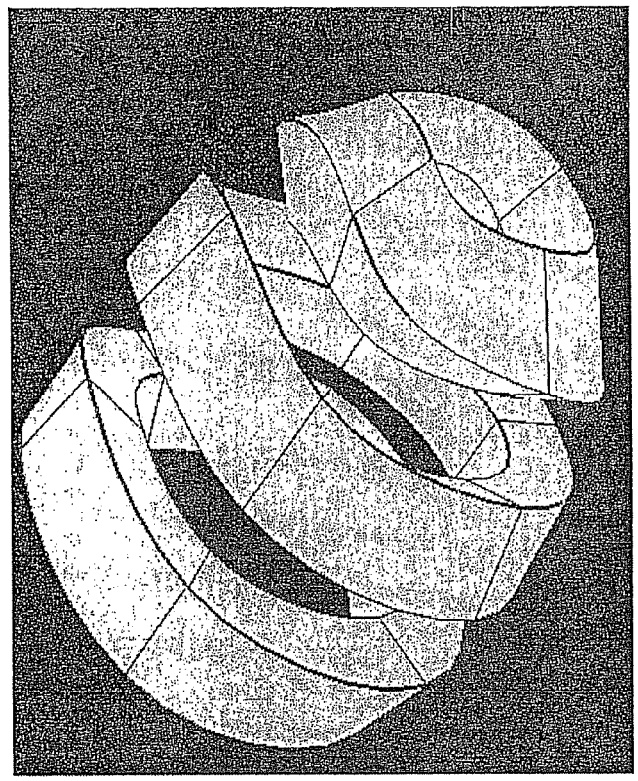
FIG. 3 shows a polyhedral arrangement example using a first polyhedral arrangement method.

FIG. 3 shows an example using the first polyhedral arranging method when the subject is an internal organ of a saclike shape such as the heart. In this arranging method, the outer circumferential face and the inner circumferential face of a disk are arranged so as to be conformed to an outside boundary face and an inside boundary face of a wall of the heart with reference to the shape information acquired in the shape information acquiring unit 12. For example, when the shape information of the subject is acquired as data of a vertex coordinate of a polygon, the polyhedron is arranged such that the vertex coordinate constituting one face (called face A) of the polyhedron is conformed to the vertex coordinate of the outside boundary face, and the vertex coordinate of face B opposed to face A is conformed to the vertex coordinate of the inside boundary face.

Further, even when it is not strictly conformed to the vertex coordinate of the shape information, the polyhedron is arranged by using a coordinate calculated on the basis of the vertex coordinate. For example, this is effective when fine irregularities of the subject are neglected and a whole shape is concerned, etc. The polyhedron is arranged by smoothing original shape information so that the whole shape can be shown.

The polyhedron of the disk shape is spaced and arranged. All vertex data of the shape information are not used but only one portion is used at a polyhedron generating time so that the polyhedron can be spaced and arranged. The spacing is preferably determined from viewpoints of complicatedness of the shape and easiness of observation. The shape of the entire heart can be understood and the shape of a wall corresponding to the rear side seen from a visual point can be also grasped by such construction and arrangement of the polyhedron.

The polyhedron is not limited to a planar construction, but may be also constructed by plural curved surfaces as illustrated here. Further, in this arrangement example, the polyhedron is arranged so as to abut on both the outside boundary face and the inside boundary face of the subject. However, the polyhedron may be also arranged so as to abut on only one boundary face in accordance with an observation object, and the other face may be also arranged such that, e.g., the thickness of the polyhedron becomes a prescribed value.

(2-3-2) Second Polyhedral Arranging Method

A second polyhedral arranging method will next be explained.

Figure 4:
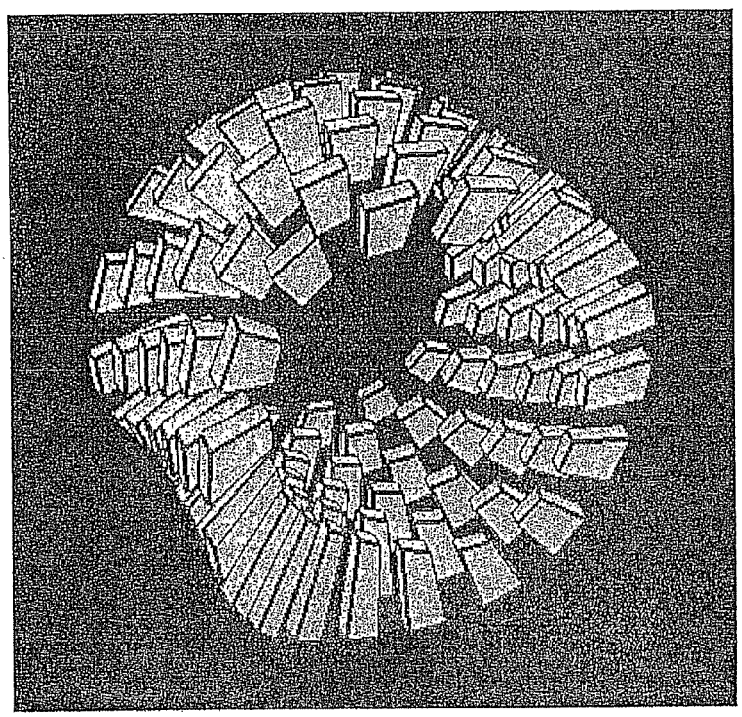
FIG. 4 shows a polyhedral arrangement example using a second polyhedral arrangement method.

The second polyhedral arranging method is an example for spacing and arranging plural hexahedrons. FIG. 4 shows an example of an arrangement in an internal organ of a sleeve shape such as a blood vessel. In this arranging method, faces constituting the front and rear of a hexahedron are arranged so as to be conformed to the outside boundary and the inside boundary of a blood vessel wall with reference to the shape information acquired in the shape information acquiring unit 12. The rear side of the blood vessel unable to be formerly observed from a visual point of one place can be also observed by spacing and arranging the polyhedron in this way.

(2-3-3) Third Polyhedral Arranging Method

A third polyhedral arranging method will next be explained.

In the third polyhedral arranging method, the number of polyhedrons is one, but the polyhedron itself is constructed so as to have a hole. The rear side of the subject unable to be formerly observed from a visual point of one place can be also observed by constructing and arranging the polyhedron in this way.

(2-3-4) Other Polyhedral Arranging Methods

The examples of the polyhedral arranging methods have been described as mentioned above, but the polyhedrons of plural kinds may be also arranged in accordance with places and time.

For example, the polyhedron of the disk shape shown in the first polyhedral arranging method, and the hexahedron shown in the second polyhedral arranging method may be also mixed and arranged. When the hexahedron is arranged in a pointed end portion of the heart and the polyhedron of the disk shape is arranged in a portion except for this pointed end portion, the shape of the pointed end portion is more easily grasped without obstructing the observation of a functional value.

Further, the arrangement of the polyhedron may be also changed in accordance with a visual point for observing the subject as another modified example of the polyhedral arranging method. For example, when one portion of the subject is concerned and becomes a visual point hidden by other portions, display obstructing no observation of the concerned portion can be performed by adaptively widening an arranging interval of the polyhedron of this side, and changing the kind of the arranged polyhedron.

(2-4) Functional Information Mapping Unit 18

Next, in step 4, the functional information mapping unit 18 refers to the functional information acquired in the functional information acquiring unit 14, and allocates the functional information to the generated polyhedron.

The functional information is allocated to a face of the polyhedron by a method of a brightness map in a gray scale, a color map using a color table, etc., or conversion into a text character, etc. in accordance with its value.

At this time, for example, a spatial average value of the functional value in a position of the polyhedron is calculated, etc., and a typical value may be allocated to the polyhedron. The allocation may be also performed in a shape expressing a distribution of the functional value of a locating range of the polyhedron.

Figure 5:
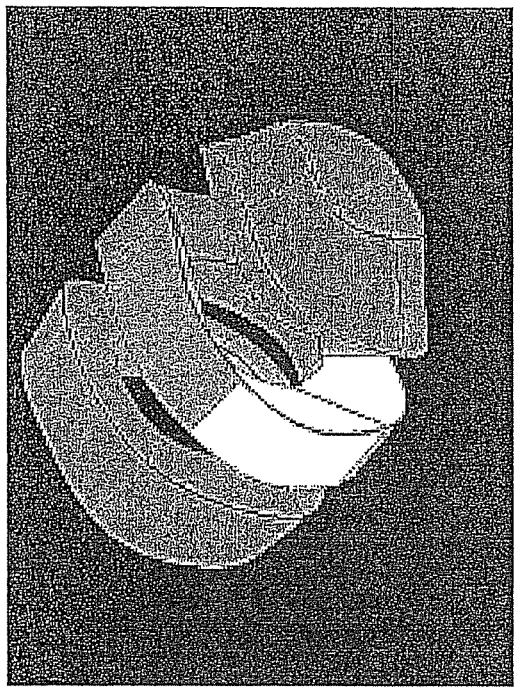
FIG. 5 shows a display example of a functional value when the functional value is allocated to a color.

FIG. 5 shows an example in which the functional value is converted into a color, which is allocated to the polyhedron arranged by the first polyhedral arranging method. In this figure, no color can be expressed so that the color is shown by light and shade. A different color is allocated by the magnitude of the functional value. While the actual shape of the entire subject is grasped, a difference of the functional value every position of the subject can be intuitively understood.

Figure 6:
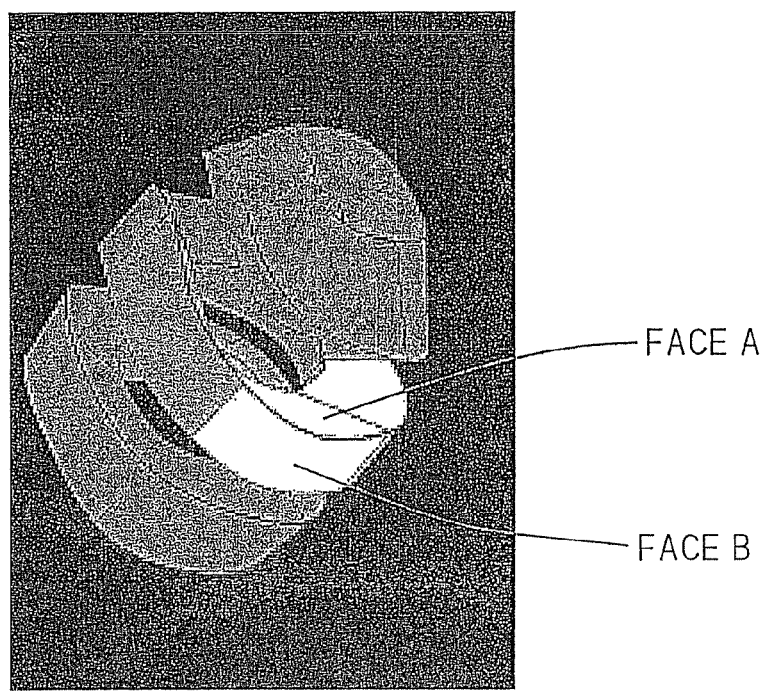
FIG. 6 shows a display example in which the functional values of plural kinds are allocated to a polyhedron.

Further, since the polyhedron has plural faces, plural functional values can be simultaneously observed by allocating the functional values of different kinds to different faces. For example, a strain every direction such as a strain of the thickness direction of a wall, and a strain of a direction along the wall can be defined with respect to a strain (distortion) value of a heart wall. In such a case, when the strain of the thickness direction of the wall is allocated to a face (face A of FIG. 6) of the thickness direction of the wall of the polyhedron, and the strain of the direction along the wall is allocated to a side face (face B of FIG. 6) of the polyhedron, display conformed to the definition of the functional value can be performed, and display intuitively easily understood can be performed.

As an example for displaying the distribution of the functional value, for example, when the functional value is different on the inside boundary face and the outside boundary face of the subject, a value therebetween is interpolated and a color can be also displayed in a gradation shape on a face of the polyhedron. Otherwise, when the functional value can be closely acquired in an area between the inside boundary face and the outside boundary face of the subject, the distribution of this functional value may be also displayed by the color display, a contour line, etc. of a gradation shape on the face of the polyhedron. The distribution of the functional value can be observed in larger portions in comparison with the former case by showing the shape and the distribution of the functional value by using the polyhedron in this way.

(2-5) Display Unit 20

Finally, in step 5, the polyhedron provided by mapping the functional information is displayed by the display unit 20.

For example, the polyhedron is displayed in a display device. No display device is limited.

(3) Modified Example

The present invention is not limited to each of the above embodiment modes, but can be variously modified as long as these modifications are not departed from its spirit.

For example, no display in a former wire frame is obstructed in this embodiment mode. Shape display in the wire frame may be also performed together simultaneously with the display of the polyhedron.

Further, in accordance with this embodiment mode, the shape and the functional value of the subject can be grasped from a visual point of one place. However, in a three-dimensional observing case, it is not limited to the observation from the visual point of one place, but a means for changing the visual point may be also additionally arranged by a pointing device, etc.

(4) Effect

As mentioned above, in accordance with this embodiment mode, the shape of the subject can be grasped as an envelope surface of plural polyhedrons, and a clearance is arranged between the polyhedrons. Therefore, a hidden portion is small, and an entire aspect can be understood. Thus, the mode and the functional value of the subject can be observed at one time without forcing a burden of correspondence setting of a position onto an observer.

Further, the functional values of plural kinds can be intuitively displayed at one time by allocating the functional value of a different kind to each face of the polyhedron.

What is claimed is:

1. An image generator for medical use, comprising:
   a non-transitory computer-readable medium that stores:
   a shape acquiring unit configured to acquire shape information showing a three-dimensional shape of a subject;
   a functional information acquiring unit configured to acquire functional information showing at least one state of each portion of said subject;
   a polyhedron generating unit configured to generate three-dimensional data showing the three-dimensional shape of said subject by arranging plural polyhedrons and a clearance so as to have the clearance using only one portion of said shape information;
   a mapping unit configured to respectively allocate said functional information at each of said polyhedrons to at least one face of each of said polyhedrons; and
   an image generating unit configured to project said three-dimensional data to an image plane, and generate an image of the subject of said three-dimensional shape on said image plane so that an area of said image corresponding to said at least one face shows said functional information allocated to said at least one face.

2. The image generator according to claim 1, wherein said polyhedron is a hexahedron, or a solid body of a disk shape, a columnar shape, a cylindrical shape or a donut shape.

3. The image generator according to claim 1, wherein said shape information is data relative to a wire frame.

4. The image generator according to claim 1, wherein said mapping unit allocates a color or a brightness value according to said functional information to a face of said polyhedron.

5. The image generator according to claim 1, wherein said functional information acquiring unit acquires said functional information of plural kinds, and
said mapping unit respectively allocates the functional information of said plural kinds to a different face of said polyhedron.

6. The image generator according to claim 1, wherein said mapping unit allocates a distribution of said functional information to a face of said polyhedron as a color, a brightness value or a contour line according to said functional information.

7. The image generator according to claim 1, wherein said functional information is a strain value, and
said mapping unit respectively allocates said plural strain values of different directions to different faces of said polyhedron.

8. An image generating method for medical use, comprising the steps of:
a shape acquiring step configured to acquire shape information showing a three-dimensional shape of a subject;
a functional information acquiring step configured to acquire functional information showing least one state of each portion of said subject;
a polyhedron generating step configured to generate three-dimensional data showing the three-dimensional shape of said subject by arranging plural polyhedrons and a clearance so as to have the clearance using only one portion of said shape information;
a mapping step configured to respectively allocate said functional information at each of said polyhedrons to at least one face of each of said polyhedrons; and
an image generating step configured to project said three-dimensional data to an image plane, and generate an image of the subject of said three-dimensional shape on said image plane so that an area of said image corresponding to said at least one face shows said functional information allocated to said at least one face.

9. The image generating method according to claim 8, wherein said polyhedron is a hexahedron, or a solid body of a disk shape, a columnar shape, a cylindrical shape or a donut shape.

10. The image generating method according to claim 8, wherein said shape information is data relative to a wire frame.

11. The image generating method according to claim 8, wherein said mapping step allocates a color or a brightness value according to said functional information to a face of said polyhedron.

12. The image generating method according to claim 8, wherein said functional information acquiring step acquires said functional information of plural kinds, and
said mapping step respectively allocates the functional information of said plural kinds to a different face of said polyhedron.

13. The image generating method according to claim 8, wherein said mapping step allocates a distribution of said functional information to a face of said polyhedron as a color, a brightness value or a contour line according to said functional information.

14. The image generating method according to claim 8, wherein said functional information is a strain value, and
said mapping step respectively allocates said plural strain values of different directions to different faces of said polyhedron.

15. A non-transitory computer-readable medium storing instructions of a computer program which when executed by a computer results in performance of functions comprising:
a shape acquiring function configured to acquire shape information showing a three-dimensional shape of a subject;
a functional information acquiring function configured to acquire functional information showing least one state of each functional portion of said subject;
a polyhedron generating function configured to generate three-dimensional data showing the three-dimensional shape of said subject by arranging plural polyhedrons and a clearance so as to have the clearance using only one portion of said shape information;
a mapping function configured to respectively allocate said functional information at each of said polyhedrons to at least one face of each of said polyhedrons; and
an image generating function configured to project said three-dimensional data to an image plane, and generate an image of the subject of said three-dimensional shape on said image plane so that an area of said image corresponding to said at least one face shows said functional information allocated to said at least one face.

16. The image generator for medical use according to claim 1, wherein
said polyhedron generating unit arranges said clearance also at a space where said three-dimensional shape of said subject exists.

* * * * *